United States Patent Office 3,376,232
Patented Apr. 2, 1968

3,376,232
PURIFICATION OF STABILIZERS
Harry W. Coover, Jr., and Richard L. McConnell, Kingsport, Tenn., assignors to Eastman Kodak Company, Rochester, N.Y., a corporation of New Jersey
No Drawing. Filed May 27, 1964, Ser. No. 370,670
10 Claims. (Cl. 252—400)

ABSTRACT OF THE DISCLOSURE

Compounds such as quinolines, primary and secondary amines, including diamines, and esters of acids such as thiodipropionic acid, known to be useful for example as antioxidants or antiozonants for organic materials are purified and stabilized to deterioration by treating said compounds with an organic trivalent or pentavalent phosphorus compound such as a triorganophosphite, a diorganohydrogen phosphite, an organophosphorus oxide, or a phosphorus amide.

This invention relates to the purification and stabilization of compounds commonly employed as antioxidant or antiozonant stabilizers for a variety of organic materials such as food, fuels such as gasoline and kerosene, rubbers and other elastomers and various polyolefins such as polyethylene, polypropylene and the like. More particularly the invention relates to the purification of non-phenolic stabilizers exemplified by certain heterocyclic compounds, certain amine and diamine derivatives as well as derivatives of thioacids, among which may be mentioned quinoline derivatives such as 1,2-dihydro-2,2,4-trimethyl-6-phenylquinoline and 6-ethoxy-1,2-dihydro-2,2,4-trimethylquinoline, amines such as diphenylamine, β-naphthylamine, N-phenyl-β-naphthylamine and the like, diamines such as N,N'-diphenyl-phenylenediamine, N,N'-di-β-naphthyl-p-phenylenediamine and the like and such derivatives of thioacids as the dialkyl or diaryl esters of thiodipropionic acid.

It is well known in the art to which the present invention relates that antioxidant and antiozonant stabilizers for such organic substances as food, gasoline, rubber and other elastomers, polyolefins and the like, of the type referred to above, are subject to the formation of undesirable color and odor. Such substances are normally light colored compounds having a mild odor when freshly prepared. However, many of these compounds take on a definite discoloration when allowed to stand or when they are subjected to thermal action in use and at the same time acquire a strong and rather unpleasant odor. Such deterioration in color and odor may be attributed to a number of causes among which may be mentioned certain oxidative phenomena as well as the formation of sludge-forming or color-forming bodies. This type of deterioration is particularly objectionable in the case of the phenylenediamine derivatives such as those commonly employed in gasoline as, for example, N,N'-di-secondary-butyl-p-phenylene diamine, N-N'-dioctyl-p-phenylene diamine and N-N'-diphenyl-p-phenylenediamine. In addition to the above mentioned disadvantages inherent in the employment of unpurified stabilizers of this type several other problems arise. For example, in dealing with polyolefin type plastics, such as polypropylene, frequently if the stabilizer is employed in sufficient amounts to give the desired effect it has a tendency to exude from the material, causing greasy or hazy surface effects in products produced therefrom. In the case of food antioxidants the retention of even minute amounts of the purifying substances may be objectionable from the standpoint of toxicity and nonconformity with the food and drug laws.

It is the principal object of the present invention to provide a means for improving the resistance of non-phenolic antioxidant and antiozonant stabilizers to deterioration in color and odor with age or under thermal influences.

A further object is to provide an improved means or method of producing purified and stabilized non-phenolic stabilizers adapted for use as antioxidant or antiozonant stabilizers for a wide variety of organic materials and which are not subject to deterioration by oxidative or other influences and free from any tendency toward the development of objectionable color and odor under normal conditions of storage and use.

A further object is to provide purified antioxidant or antiozonant stabilizers for organic substances such as food, gasoline, rubber and various polymeric substances which, not only are free from any tendency toward development of objectionable color and odor, but also are free from any trace of the material employed in their purification.

Other objects will appear hereinafter.

These objects are accomplished by the following invention which is based on the discovery that, when non-phenolic stabilizers of the type normally employed for the antioxidant, antiozonant or other treatment of organic substances such as foods, gasoline, rubber and other elastomers and polyolefins such as polyethylene, polypropylene and the like, are treated with an organophosphorus compound such as a simple phosphorus ester, phosphorus esteramide or phosphorus amide, a high degree of purification and stabilization of the stabilizing agent is obtained and the stabilizer is thereby rendered highly resistant to degradation and discoloration and to the development of undesirable odor. The purifying or stabilizing agents of our invention may be represented by the following structural formula:

wherein R may be the same or different alkoxy, aryloxy or dialkylamino groups, R' may be alkoxy, aryloxy, dialkylamino or hydrogen and X may be oxygen or zero. Typical alkoxy groups include for example those which have about 18 carbon atoms or less such as methoxy, ethoxy, butoxy, isobutoxy, 2-ethylhexyloxy, dodecyloxy, octadecyloxy and the like. Aryloxy may include phenoxy, alkyl-substituted phenoxy, aryl-substituted phenoxy and the like. Dialkylamino groups may include for example lower dialkyl amino groups having for instance about 4 carbon atoms or less such as dimethylamino, diethylamino, methylethylamino, dibutylamino, diisobutylamino and the like. Cyclic esters are also operable in our invention. In this case the two R groups would be joined in a cyclic structure such as in 2,2-dimethyl-1,3-propanediol cyclic hydrogen phosphite,

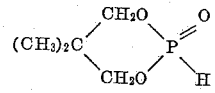

or in dihexadecyl pentaerythritol diphosphite,

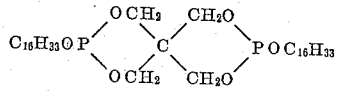

The non-phenolic stabilizing agents which can be treated with special efficacy in accordance with our invention to attain the desired degree of purification and stabilization against discoloration and odor formation are certain heterocyclic compounds and certain amine and diamine derivatives as well as certain derivatives of thioacids such as the dialkyl or diaryl esters of thiodipropionic acid. Among these may be mentioned quinoline derivatives such as 1,2-dihydro-2,2,4-trimethyl-6-phenylquinoline and 6-ethoxy-1,2-dihydro-2,2,4-trimethylquinoline. Among the amine derivatives which may be employed in accordance with our invention are diphenylamine, bis(octylphenyl)amine, bis(dodecylphenyl)amine, β-naphthylamine, N-phenyl-β-naphthylamine and N-octyl-β-naphthylamine. Among typical diamine derivatives may be mentioned N,N'-diphenyl-p-phenylenediamine; N,N'-di-β-naphthyl-p-phenylenediamine; N,N'-di-2-octyl-p-phenylenediamine; N,N'-di-3(5-methylheptyl)-p-phenylenediamine; N,N'-dimethyl-N,N'-di(1-methylpropyl)-p-phenylenediamine and N,N'-di-sec. butyl-p-phenylenediamine; N,N'-diisopropyl-p-phenylenediamine; N-cyclohexyl-N'-phenyl-p-phenylene-diamine and N,N'-bis(1,3-dimethylbutyl)-p-phenylenediamine. Among derivatives of thio acids may be mentioned dialkyl esters of thiodipropionic acid such as dilauryl thiodipropionate, dioctyl thiodipropionate, dioctadecyl thiodipropionate, diaryl esters such as diphenyl thiodipropionate, ditolyl thiodipropionate and the like.

In accordance with our invention our new and improved stabilizing and purifying procedure may be carried out in several different ways, depending upon whether the antioxidant or antiozonant stabilizing compounds to be treated are liquids or solids at room temperature. In the case of substances which are solids at room temperature the compound to be treated is dissolved at a suitable concentration in a solvent therefor which contains in solution a small amount of one of the organophosphorus stabilizing agents described above. A wide variety of solvents may be employed and the stabilizer undergoing purification may be dissolved therein over a wide range of concentrations. The solvent will be selected in accordance with the stabilizer being treated and the solubility of the stabilizer in the solvent selected. Likewise, the concentration of the organophosphorus compound, i.e., the phosphorus ester, phosphorus ester amide or phosphorus amide employed as the purifying and stabilizing agent may vary widely but, in general, only a sufficient amount of the agent will be employed to accomplish the purifying and stabilizing action desired. Typical procedures may be carried out as described below.

For example, one may crystallize the stabilizer compound from a solution thereof in a solvent already containing the organophosphorus purifying agent in solution or the compound to be purified may be dissolved in the desired concentration in a hot solvent therefor to which solution is then added the organophosphorus compound in an appropriate amount and the resulting three component solution thereafter allowed to cool, whereupon the antioxidant or antiozonant stabilizer compound crystallizes out in pure form free from the organophosphorus purifying and stabilizing agent. After crystallization is complete the desired purified compound is removed by filtration and dried. By proceeding in this manner the added purifying and stabilizing agent is completely mixed with and dispersed in the agent to be purified, thus permitting it to have its maximum purifying and stabilizing effect on the agent undergoing treatment. The mechanism by which the purifying agent acts to prevent subsequent oxidative or other deterioration and resulting development of discoloration and odor is not fully understood but we have found as a fact that it does have this surprising and desirable effect. It is to be particularly pointed out that the organophosphorus purifying or stabilizing compound is completely removed from the stabilizer by the crystallizing step so that there is obtained a pure antioxidant or antiozonant stabilizer free from any type of contaminant and thus, in the case of a food stabilizer or antioxidant, meeting the strict requirements of the food and drug laws.

In those cases where the stabilizer to be treated is liquid at room temperature the purifying and stabilizing procedure in accordance with our invention is as follows: the liquid stabilizer compound to be purified and stabilized is mixed with and dissolved in a suitable organic solvent for both the organophosphorus purifying and stabilizing agent and the stabilizer undergoing purification. In such a case the solvent and the organophosphorus compound are distilled from the resulting three component solution, thus isolating the desired high boiling purified stabilizer free from any of the organophosphorus purifying compound. The residue may be further purified by conventional distillation techniques if desired.

It is also possible in accordance with our invention to purify the stabilizers undergoing treatment without using a solvent. By this technique, liquid stablizers are treated with the organophosphorus compound and then the compounds are separated by conventional distillation procedures. If the stabilizer is a solid compound, then the stabilizer is melted and the molten material is mixed with a sufficient amount of the organophosphorus compound. Subsequently, the stabilizer and the organophosphorus compound are separated by distillation. This latter technique works better for stabilizers which melt below 150° C. so that excessive temperatures are avoided during the treatment step.

As in the recrystaillization procedure described above for the purification of solid stabilizers, distillation of the mixture provides purified stabilizer free from the treated organophosphorus compound.

Reference has been made above to the employment of sufficient amounts of the organophosphorus purifying or stabilizing compound. In general this will vary from about 0.1 to about 50 percent, based on the weight of the stabilizer to be treated. The time of treatment of the stabilizer compound undergoing purification and stabilization with the organophosphorus compound in accordance with our invention may vary widely depending upon the stabilizer being treated and organophosphorus compound selected for this treatment. Thus the time can vary from about 1–5 minutes to about 6–8 hours. Likewise the temperature employed for such stabilizing and purifying treatment may range from 0° C. to 150° C. and preferably 0° C. to 100° C. depending upon the stabilizer being treated and the organophosphorus compound employed for the purpose.

In the following examples and description we have set forth several of the preferred embodiments of our invention but they are included merely for purposes of illustration and not as a limitation thereof.

EXAMPLE I

Purification and stabilization of dilauryl thiodipropionate

Ten grams of dilauryl thiodipropionate was placed in 100 ml. of isopropyl alcohol which contained 5 g. of bis(2-ethylhexyl) hydrogen phosphite in solution and the mixture was heated on the steam bath until the dilauryl thiodipropionate dissolved. When the solution cooled, the dilauryl thiodipropionate precipitated as colorless crystals. These crystals were separated from the solvent and phosphite by filtration. The crystals were washed while still on the filter with additional cold solvent until the filtrate gave a negative test for phosphorus. After drying, a sample of the recrystallized dilauryl thiodopropionate was subjected to a temperature of 250° C. for 3 minutes. The sample remained completely colorless. When a sample of the unrecrystallized dilauryl thiodipropionate was subjected to this heat test, it developed a yellow color. Similar beneficial results were obtained when dilauryl thiodipropionate was recrystallized from solvents containing respectively 0.1 to 10 percent tris(2-ethylhexyl) phosphite, trilauryl phosphite, hexamethylphosphoric triamide, hexamethyl phosphorous triamide, O,O-dibutyl N,N-dimethylphosphoramidate, O,O - dibutyl N,N - diethylphosphoramidite, octyl bis(octylphenyl) phosphite, dioctyl octylphenyl phosphite, and dihexadecyl pentaerythritol diphosphite and tested according to the procedure described above.

EXAMPLE II

Stabilization of polypropylene with purified dilauryl thiodipropionate 270 grams of stereoregular polypropylene was blended in a Banbury mixer with 0.8 grams of dilauryl thiodipropionate which had been previously purified according to the procedure described in Example I and then extruded and pelletized. The pellets were clear and colorless. The polymer could be used as a packaging material for applications in which the plastic material comes in contact with food since none of the stabilizing phosphite compound was retained in the purified stabilizer.

When polypropylene was stabilized with unrecrystallized dilauryl thiodipropionate and extruded into pellets, the pellets had a yellowish-gray discoloration presumably due to formation of decomposition products. This discoloration increased when the pellets were molded into a plastic sheet

EXAMPLE III

Purification and stabilization of N,N'-diphenyl-p-phenylenediamine (DPPD)

One hundred grams of DPPD was recrystallized from toluene containing 2 g. of tributyl phosphite according to the procedure described in Example I. The recrystallized stabilizer melted at 150–151° C.

Other solid p-phenylenediamine derivatives which were purified in a similar manner included N,N'-diisopropyl-p-phenylenediamine (M.P. 56° C.), N-cyclohexyl-N'-phenyl-p-phenylenediamine (M.P. 128–130° C.), and N,N'-bis(1,3 - dimethylbutyl)-p-phenylenediamine (M.P. 46° C.).

Gasoline solutions containing 1 g. of each of these stabilizers did not change in color or form sludge when allowed to stand for 7 days.

EXAMPLE IV

Purification and stabilization of N,N'-disec. butyl-p-phenylenediamine

Fifty grams of N,N'-disec. butyl-p-phenylenediamine was dissolved in 250 ml. of toluene containing 5 g. of triethyl phosphite. This mixture was stirred for 30 minutes at 25° C. and then the solvent and phosphite were distilled from the stabilizer under reduced pressure. Finally the stabilizer was distilled at a temperature of 95° C. at a pressure of 0.1 mm.

One ml. of this purified N,N'-disec. butyl-p-phenylenediamine was added to 100 ml. of gasoline. No change in color was noted after the solution had stood for 7 days. When a similar solution was prepared containing crude N,N'-disec. butyl-p-phenylenediamine which had not been purified by the above treatment, the solution was found to be amber in color after 7 days.

EXAMPLE V

Purification and stabilization of N,N'-diisopropyl-p-phenylenediamine 100 g. of N,N'-diisopropyl-p-phenylenediamine (M.P. 56° C.) was melted and stirred at 75° C. while 5 ml. of tributyl phosphite was added. The molten mixture was stirred for 30 minutes and then the products were separated by distillation. Gasoline solutions containing 0.25 percent of the purified and stabilized N,N'-diisopropyl-p-phenylenediamine did not change in color when allowed to stand for 7 days. Similarly beneficial results were obtained when the N,N'-diisopropyl-p-phenylenediamine was treated in the molten state with tris(2-ethylhexyl) phosphite, trilauryl phosphite, dibutyl hydrogen phosphite, and hexamethylphosphoric triamide.

It will be seen from the above description and the examples set forth hereinabove that there is provided by the present invention a relatively simple and easily workable means of purifying and stabilizing a wide variety of non-phenolic substances used as antioxidants, antiozonants and the like, and by a purification and stabilization process which leaves no trace of the stabilizing and purifying compound in the purified compound itself. This latter feature is of special importance in the stabilization and purification of food antioxidants which must conform to the strict standards of purity demanded by the food and drug laws.

Although the invention has been described in considerable detail with particular reference to certain preferred embodiments thereof, variations and modifications can be effected within the spirit and scope of the invention as described hereinabove, and as defined in the appended claims.

We claim:

1. A method for improving the color and odor stability of a non-phenolic antioxidant or antiozonant stabilizer for organic substances including food, gasoline, rubber and polyolefins, which tend to become discolored and to develop an odor with age, said stabilizer being selected from the group consisting of quinoline derivatives, amine derivatives, diamine derivatives, dialkyl thiodipropionates and diaryl thiodipropionates, which comprises treating said stabilizers with from about 0.1 to about 50 percent, based on the weight of the stabilizer, of an organophosphorus stabilizing and purifying compound selected from the group consisting of phosphorus esters, phosphorus ester amides and phosphorus amides and having the structural formula

wherein each R is a substituent selected frm the group consisting of alkoxy having about 18 carbon atoms or less, phenoxy, alkyl substituted phenoxy, aryl substituted phenoxy, and lower dialkylamino groups; R' is a substituent selected from the group consisting of alkoxy having about 18 carbon atoms or less, phenoxy, alkyl substituted phenoxy, aryl substituted phenoxy, lower dialkylamino groups and hydrogen; and X represents oxygen or zero, said treatment being carried out at a temperature within the range of 0° C.–150° C. for a period of from about 1–5 minutes to about 6–8 hours and thereafter recovering the non-phenolic stabilizer from the mixture free from the organophosphorus stabilizing and purifying compound.

2. The method of claim 1 wherein each R is a substituent selected from the group consisting of alkoxy having about 18 carbon atoms or less, phenoxy, alkyl substituted phenoxy, and aryl substituted phenoxy groups; and R' is a substituent selected from the group consisting of alkoxy having about 18 carbon atoms or less, phenoxy, alkyl substituted phenoxy, aryl substituted phenoxy groups and hydrogen.

3. The method of claim 1 in which said organophosphorus compound has the structural formula:

4. The method of claim 1 wherein each of R and R' is a lower dialkylamino group.

5. The method of claim 4 in which the organophosphorus compound is hexamethylphosphoric triamide.

6. The method of claim 1 in which said stabilizer is a dialkyl thiodipropionate.

7. The method of claim 1 in which said stabilizer is a substituted p-phenylenediamine.

8. The method of claim 2 in which the organophosphorus compound is selected from the group consisting of trilauryl phosphite, tris(2-ethylhexyl)phosphite, bis(2- ethylhexyl)hydrogen phosphite, triethyl phosphite, or tributyl phosphite.

9. The method of claim 6 in which said organophosphorus compound is selected from the group consisting of bis(2-ethylhexyl)hydrogen phosphite, tris(2-ethylhexyl) phosphite, trilauryl phosphite, hexamethyl phosphoric triamide, hexamethyl phosphorous triamide, O,O-dibutyl-N,N - dimethyl - phosphoramidate, O,O - dibutyl - N,N-diethyl - phosphoramidate, octyl - bis(octylphenyl)phosphite, dioctyl-octylphenyl phosphite and dihexadecyl-pentaerythritol-diphosphite.

10. The method of claim 7 in which said stabilizer is selected from the group consisting of N,N′-diphenyl-p-phenylene - diamine, N,N′ - diisopropyl - p - phenylene-diamine, N,N′ - dioctyl - p - phenylenediamine, N,N′ - di-beta - naphthyl - p - phenylenediamine, N - cyclohexyl-N′ - phenyl - p - phenylenediamine, N,N′ - bis(1,3 - dimethylbutyl)p - phenylenediamine, N,N′ - disec. butyl - p-phenylenediamine and said organo-phosphorus compound is selected from the group consisting of tributylphosphite, triethyl phosphite, tris (2-ethylhexyl)phosphite, trilauryl phosphite, dibutyl, hydrogen phosphite and hexamethyl-phosphoric triamide.

References Cited
UNITED STATES PATENTS

| | | | |
|---|---|---|---|
| 2,734,808 | 2/1956 | Biswell | 252—401 X |
| 2,828,320 | 3/1958 | Gibson | 252—400 X |
| 3,101,363 | 8/1963 | Baranauckas et al. | 252—400 X |
| 3,115,465 | 12/1963 | Orloff et al. | 252—400 X |

LEON D. ROSDOL, *Primary Examiner.*

M. WEINBLATT, *Assistant Examiner.*